United States Patent
Huang et al.

(10) Patent No.: US 12,183,079 B1
(45) Date of Patent: Dec. 31, 2024

(54) METHOD, APPARATUS AND ROBOT FOR OUT-OF-STOCK DETECTION OF SHELF COMMODITIES

(71) Applicant: Hanshow Technology Co., Ltd., Zhejiang (CN)

(72) Inventors: Sheng Huang, Zhejiang (CN); Yanhao Jing, Zhejiang (CN); Xudong Zhou, Zhejiang (CN); Jing Fan, Zhejiang (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 0 days.

(21) Appl. No.: 18/738,955

(22) Filed: Jun. 10, 2024

(30) Foreign Application Priority Data

Sep. 12, 2023 (CN) .......................... 202311174653.7

(51) Int. Cl.
*G06V 20/50* (2022.01)
*G06T 7/50* (2017.01)
(Continued)

(52) U.S. Cl.
CPC ................ *G06V 20/50* (2022.01); *G06T 7/50* (2017.01); *G06V 10/22* (2022.01); *G06V 10/761* (2022.01);
(Continued)

(58) Field of Classification Search
CPC ........ G06V 20/50; G06V 20/63; G06V 10/22; G06V 10/761; G06V 30/16; G06T 7/50;
(Continued)

(56) References Cited

U.S. PATENT DOCUMENTS

| | | | |
|---|---|---|---|
| 11,842,321 B1* | 12/2023 | Zou | G06V 20/52 |
| 12,056,756 B2* | 8/2024 | Adato | H04N 7/18 |
| 2019/0073559 A1 | 3/2019 | Rzeszutek et al. | |

(Continued)

FOREIGN PATENT DOCUMENTS

| | | |
|---|---|---|
| CN | 109446883 A | 3/2019 |
| CN | 112215142 A | 1/2021 |

(Continued)

OTHER PUBLICATIONS

China National Intellectual Property Administration, "Search Report," issued in connection with Chinese Patent Application No. 202311174653.7, dated Oct. 25, 2023, 4 pages. [English translation provided].

(Continued)

*Primary Examiner* — Kenny A Cese
(74) *Attorney, Agent, or Firm* — Hanley, Flight & Zimmerman, LLC

(57) ABSTRACT

The disclosure discloses a method, an apparatus and a robot for out-of-stock detection of shelf commodity. The method includes: acquiring a plurality of shelf RGB images and a plurality of shelf depth images; executing an out-of-stock area detection step to obtain all vacant areas in the shelf for shelf RGB images and shelf depth images; stitching the shelf RGB images into a complete shelf image, merging and de-duplicating on all vacant areas and detection boxes of commodities, shelf label and layer lattice, and mapping them to the complete shelf image; generating a shed grid area corresponding to each commodity for the complete shelf image, and dividing all vacant areas in the shelf based on the shed grid area; and determining an out-of-stock detection result of each commodity based on the position information and the depth information of the vacant area and the shed grid area.

20 Claims, 6 Drawing Sheets

(51) Int. Cl.
*G06V 10/22* (2022.01)
*G06V 10/74* (2022.01)
*G06V 20/62* (2022.01)
*G06V 30/16* (2022.01)

(52) U.S. Cl.
CPC .............. *G06V 20/63* (2022.01); *G06V 30/16* (2022.01); *G06T 2207/10024* (2013.01); *G06T 2207/10028* (2013.01); *G06T 2207/20021* (2013.01); *G06T 2207/20221* (2013.01)

(58) Field of Classification Search
CPC ........... G06T 2207/10024; G06T 2207/10028; G06T 2207/20021; G06T 2207/20221
See application file for complete search history.

(56) References Cited

U.S. PATENT DOCUMENTS

2022/0108264 A1   4/2022  Skaff et al.
2024/0212371 A1*  6/2024  Patil .................... G06V 10/776

FOREIGN PATENT DOCUMENTS

| CN | 112215142 B   | 8/2021  |
| CN | 116129271 A   | 5/2023  |
| WO | 2022261350    | 12/2022 |
| WO | 2023275870 A1 | 1/2023  |

OTHER PUBLICATIONS

Liu et al., "Product Recognition on Shelves Based on Deep Neural Network," Packaging Engineering, vol. 41, No. 1, dated Jan. 2020, 2 pages. [English abstract provided].

Canadian Intellectual Property Office, "First Office Action," issued in connection with Canadian Patent Application No. 3,241,478, dated Jul. 24, 2024, 5 pages.

European Patent Office, "Extended European Search Report," issued in connection with European Patent Application No. 24182539.7, dated Sep. 19, 2024, 11 pages.

* cited by examiner

METHOD, APPARATUS AND ROBOT FOR OUT-OF-STOCK DETECTION OF SHELF COMMODITIES

CROSS-REFERENCE TO RELATED APPLICATION

The present disclosure claims priority to Chinese Patent Application No. 202311174653.7, filed on Sep. 12, 2023, which is hereby incorporated by reference in its entirety.

TECHNICAL FIELD

The disclosure relates to the technical field of an Electronic Shelf Label, and in particular to a method, an apparatus and a robot for out-of-stock detection of commodity on a shelf.

BACKGROUND

This portion is intended to provide background or context for embodiments of the disclosure set forth in the claims. The description herein is not acknowledged as the prior art just because it is included in this portion.

With the continuous development of artificial intelligence technology, the industry of supermarket is also constantly transforming to the direction of intelligentization and digitalization. The application of AI (Artificial Intelligence) technology enables the supermarket to better meet customer needs, improve operational efficiency, enhance user experience, and further expand the market influence of the supermarket. Through the application of artificial intelligence algorithms, the supermarket can analyze and predict consumer demands in real time, and more accurately develop marketing strategies to meet the consumer demands, thereby improving sales and customer satisfaction. The AI technology can also be used in the supermarket to automate inventory management, reduce inventory costs and shelf retention rate, and quickly replenish goods when necessary to ensure that the customers' shopping needs are met.

Digital shelf is a new type of intelligent retail tool, have intelligent analysis and automated management functions, and can meet the layout analysis and commodity recognition and other needs of the supermarket. Through real-time monitoring and data analysis of the commodities on the shelf, the digital shelf may improve the utilization rate of the shelf, optimize inventory management, and enhance the customers' shopping experience, thereby improving the operating efficiency of the supermarket. The digital shelf has become an important constituent par for intelligent retail of the supermarket and also an important trend for the development of the supermarket in the future.

In the digital shelf, out-of-stock detection such as out-of-stock area detection and out-of-stock rate detection is a key step, therefore, timely detection, discovery and analysis of out-of-stock status of the shelf is conducive to improving the business operating profit and enhance the shopping needs of shoppers.

The existing out-of-stock area detection solutions and their technical problems are as follows: image stitching is performed first and then detection and recognition are performed, which is too dependent on the effect of image stitching, or the depth information of depth images is used to directly determine the out-of-stock area, all of these solutions have low accuracy of out-of-stock area detection.

SUMMARY

Embodiments of the present disclosure provide a method for out-of-stock detection of shelf commodities, for improving the accuracy rate of out-of-stock detection of shelf commodities, the method including:

acquiring a plurality of shelf RGB images and a plurality of shelf depth images;

executing out-of-stock area detection steps as follows for each shelf RGB image and each shelf depth image:

inputting each shelf RGB image into an object detection model pre-trained by using a deep learning method, detecting all the commodities to obtain commodity detection boxes;

detecting all electronic shelf labels to obtain shelf label detection boxes; and detecting all shelf layer lattices to obtain shelf layer lattice detection boxes;

obtaining a first vacant area corresponding to each shelf RGB image based on position information of the commodity detection boxes and the shelf layer lattice detection boxes both of which correspond to each shelf RGB image;

determining a first average depth value of pixel in each shelf label detection box based on the shelf label detection boxes and the shelf depth image both of which correspond to each shelf RGB image; determining a second average depth value of pixel in each first vacant area based on the first vacant area and the shelf depth image both of which correspond to each shelf RGB image; obtaining a fourth vacant area corresponding to each shelf RGB image based on the pixel whose depth values are in a set range; and the set range is determined based on the first average depth value and the second average depth value; and merging the first vacant area and the fourth vacant area both of which correspond to each shelf RGB image to obtain all vacant areas in the shelf, and each vacant area has position information and depth information;

stitching the shelf RGB images into a complete shelf image, performing a merging process and a de-duplicating process on the commodity detection boxes, the shelf label detection boxes and the layer lattice detection boxes and all vacant areas, and mapping them to the complete shelf image;

delimiting a placement area of each commodity for the complete shelf image to generate a shed grid area corresponding to each commodity; dividing the all vacant areas in the shelf based on the shed grid area corresponding to each commodity to obtain the vacant area corresponding to each commodity, and the vacant area corresponding to each commodity has position information and depth information; and determining an out-of-stock body volume in the vacant area corresponding to each commodity as an out-of-stock detection result based on the position information and the depth information of the vacant area corresponding to each commodity.

Embodiments of the present disclosure further provide an apparatus for out-of-stock detection of shelf commodities, for improving the accuracy rate of out-of-stock detection of shelf commodities, the apparatus including:

an acquisition unit configured to acquire a plurality of shelf RGB images and a plurality of shelf depth images;

an out-of-stock area detection unit configured to execute out-of-stock area detection steps as follows for each shelf RGB image and each shelf depth image:

inputting each shelf RGB image into an object detection model pre-trained by using a deep learning method, detecting all commodities to obtain commodity detection boxes; detecting all electronic shelf labels to obtain shelf label detection boxes; and detecting all shelf layer lattices to obtain shelf layer lattice detection boxes;

obtaining a first vacant area corresponding to each shelf RGB image based on position information of the commodity detection boxes and the shelf layer lattice detection boxes both of which correspond to each shelf RGB image;

determining a first average depth value of pixel in each shelf label detection box based on the shelf label detection boxes and the shelf depth image both of which correspond to each shelf RGB image; determining a second average depth value of pixel in each first vacant area based on the first vacant area and the shelf depth image both of which correspond to each shelf RGB image; obtaining a fourth vacant area corresponding to each shelf RGB image based on the pixel whose depth values are in a set range; and the set range is determined based on the first average depth value and the second average depth value; and merging the first vacant area and the fourth vacant area both of which correspond to each shelf RGB image to obtain all vacant areas in the shelf, and each vacant area has position information and depth information;

an image stitching unit configured to splice the shelf RGB images into a complete shelf image, perform a merging process and a de-duplicating process on the commodity detection boxes, the shelf label detection boxes and the layer lattice detection box and all vacant areas, and map them to the complete shelf image;

a vacancy division unit configured to delimit a placement area of each commodity for the complete shelf image to generate a shed grid area corresponding to each commodity; divide the all vacant areas in the shelf based on the shed grid area corresponding to each commodity to obtain a vacant area corresponding to each commodity, the vacant area and the shed grid area both of which correspond to each commodity both have position information and depth information, and the vacant area corresponding to each commodity has position information and depth information;

an out-of-stock detection unit configured to determine an out-of-stock body volume in the vacant area corresponding to each commodity as an out-of-stock detection result based on the position information and the depth information of the vacant area corresponding to each commodity.

The embodiments of the present disclosure further provide a computer device including a memory, a processor and a computer program stored on the memory and executable on the processor, and when executing the computer program, the processor implementing the method for out-of-stock detection of shelf commodities as described above.

The embodiments of the present disclosure also provide a computer-readable storage medium storing a computer program, and when being executed by a processor, the computer program implements the method for out-of-stock detection of shelf commodities as described above.

The embodiments of the present disclosure also provide a computer program product including a computer program, and when being executed by a processor, the computer program implements the method for out-of-stock detection of shelf commodities as described above.

The solution of out-of-stock detection of shelf commodities provided by the embodiments of the present disclosure has the beneficial technical effects as below:

firstly, in the embodiments of the present disclosure, each shelf RGB image is input into an object detection model pre-trained by using a deep learning method, to detect all commodities to obtain commodity detection boxes; all electronic shelf labels are detected to obtain shelf label detection boxes; all shelf layer lattices are detected to obtain shelf layer lattice detection boxes, and each of detection boxes are accurately obtained to lay the foundation for subsequent out-of-stock area detection.

Secondly, compared with the solution in the prior art that the depth information of the depth image is directly used to obtain the vacant area and accuracy of out-of-stock area detection is low, the embodiments of the present disclosure can obtain a more accurate out-of-stock area by reversely deducing the vacant area using the shed grid area and the commodity detection boxes and based on the shelf visual RGB images and the shelf depth images with depth information.

Thirdly, compared with the solution that image stitching is performed first and then detection and identification are performed, which is too dependent on the effect of image stitching, and accuracy of out-of-stock area detection is low, the embodiments of the present disclosure can finally obtain a more accurate vacant area by performing image stitching after the detection of the vacant area, and comprehensively considering the shelf label position, the commodity position, the visual vacant area and the depth value information during determination of the vacant area, thereby improving the accuracy of the out-of-stock detection result.

In summary, the solution for out-of-stock detection of shelf commodities provided by the embodiments of the present disclosure improves the accuracy of the out-of-stock detection result.

BRIEF DESCRIPTION OF THE DRAWINGS

In order to more clearly illustrate the embodiments of the disclosure or the technical solution in the prior art, drawings that need to be used in the description of embodiments or the prior art will be simply introduced below, obviously the drawings in the following description are merely some examples of the disclosure, for persons ordinarily skilled in the art, it is also possible to obtain other drawings according to these drawings without making creative efforts. In the drawings.

DESCRIPTION OF THE EMBODIMENTS

In order to more clearly illustrate purpose, technical solution and advantages according to embodiments of the disclosure, hereinafter the embodiments of the disclosure will be further illustrated in detail in combination with the drawings. Here in the text, the schematic embodiments of the disclosure and the description thereof are used for explaining the disclosure and do not constitute limitation to the disclosure.

In order to better understand the embodiment of the disclosure, the terms involved in the embodiment of the disclosure are first introduced.

Figure 3:
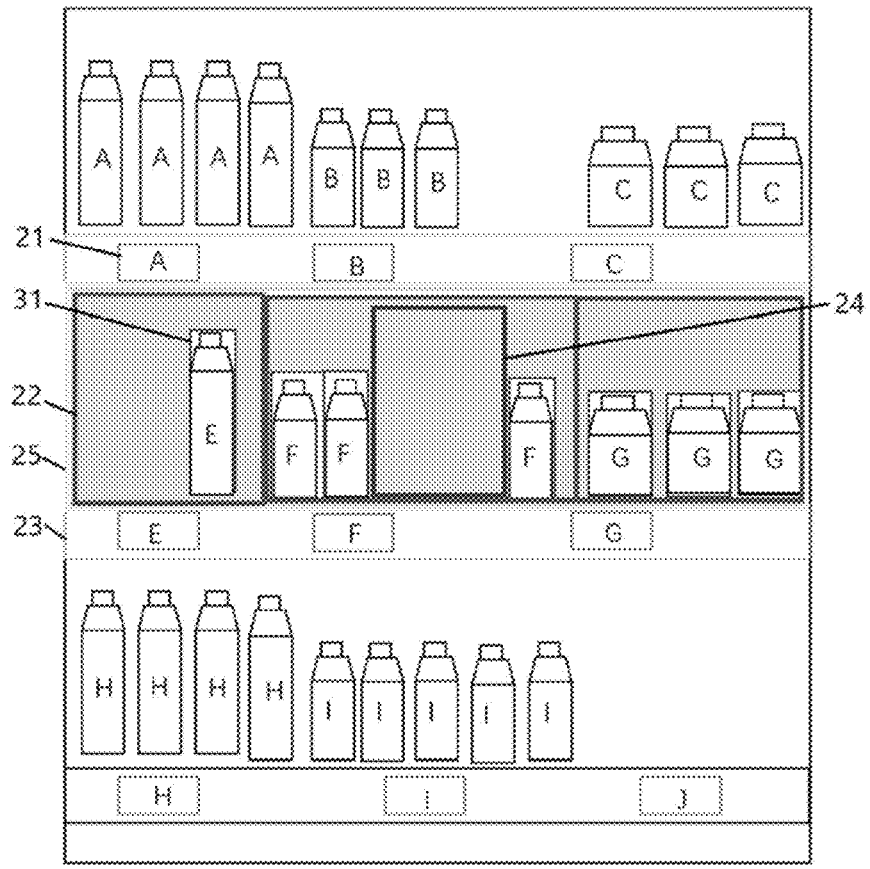
FIG. 3 is a schematic diagram of a shelf structure and layout according to an embodiment of the present disclosure.

A commodity layout, i.e., a commodity detection box refers to commodity surface that can be seen by the naked eyes and is located in the front row of the shelf, such as a commodity detection box 31 in FIG. 3.

A shelf label refers to an identifier used to show the commodity information, such as name, price and other information of the commodity, in the shelf in supermarket, such as the shelf label detection box 21 in FIG. 3.

A shed grid refers to an area occupied by several quantities of the same kind of commodity, such as a shed grid area 22 in FIG. 3.

A layer plate refers to particularly a partition for placing commodities and shelf labels at each layer of the shelf, such as a layer plate detection box 23 in FIG. 3.

A void refers to a marked area where no commodity is place, such as a void area 24 in FIG. 3.

In order to accurately measure the out-of-stock rate of each kind of commodity on the shelf at both visual level and actual depth level, an embodiment of the present disclosure provides a solution for out-of-stock detection of shelf commodities, which includes: detecting positions of vacant areas on a specific shelf where no commodity is placed and calculating a ratio of the vacant areas to an individual sku commodity area. The solution for out-of-stock detection of shelf commodities is introduced in detail below.

Figure 1:
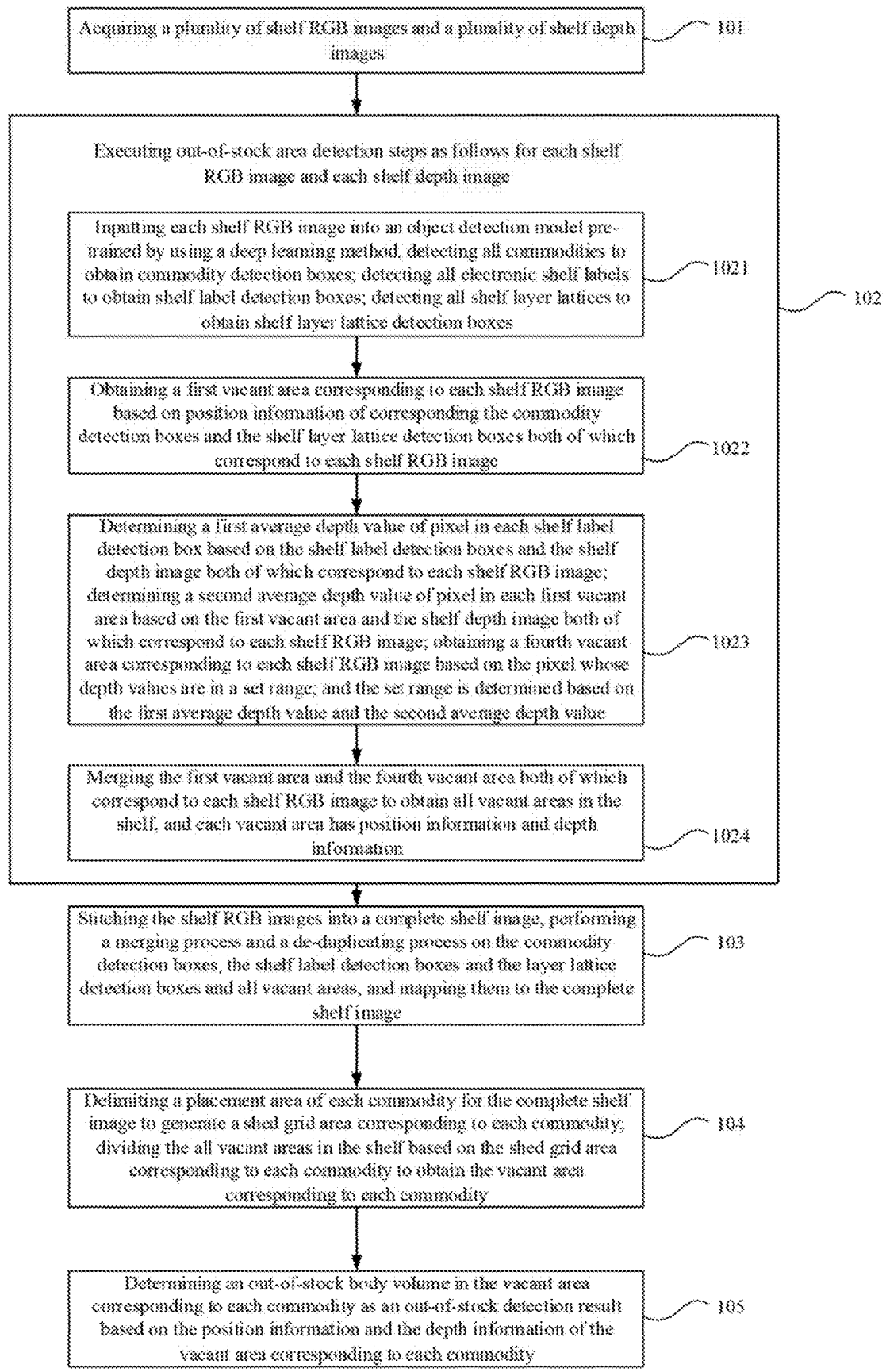
FIG. 1 is a flow schematic diagram of a method for out-of-stock detection of shelf commodities according to an embodiment of the present disclosure.
Figure 4:
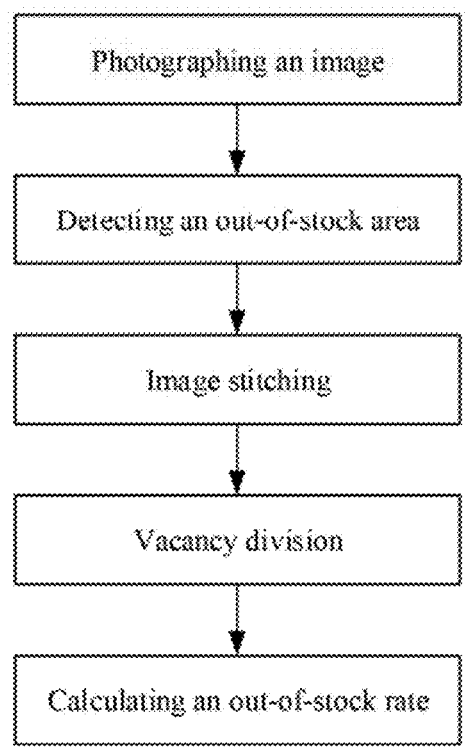
FIG. 4 is a schematic diagram of principle of out-of-stock detection of shelf commodities according to an embodiment of the present disclosure.

FIG. 1 is a flow schematic diagram of a method for out-of-stock detection of shelf commodities according to an embodiment of the present disclosure, as shown in FIG. 1, the method includes:

a step 101 of acquiring a plurality of shelf RGB images and a plurality of shelf depth images;

a step 102 of executing out-of-stock area detection steps as follows for each shelf RGB image and each shelf depth image, i.e., the steps of "detecting an out-of-stock area" in FIG. 4, including:

a step 1021 of inputting each shelf RGB image into an object detection model pre-trained by using a deep learning method, detecting all commodities to obtain commodity detection boxes; detecting all electronic shelf labels to obtain shelf label detection boxes; detecting all shelf layer lattices to obtain shelf layer lattice detection boxes;

a step 1022 of obtaining a first vacant area corresponding to each shelf RGB image based on position information of the commodity detection boxes and the shelf layer lattice detection boxes both of which correspond to each shelf RGB image;

a step 1023 of determining a first average depth value of pixel in each shelf label detection box based on the shelf label detection boxes and the shelf depth image both of which correspond to each shelf RGB image; determining a second average depth value of pixel in each first vacant area based on the first vacant area and the shelf depth image both of which correspond to each shelf RGB image; obtaining a fourth vacant area corresponding to each shelf RGB image based on the pixel whose depth values are in a set range; and the set range is determined based on the first average depth value and the second average depth value; and a step 1024 of merging the first vacant area and the fourth vacant area both of which correspond to each shelf RGB image to obtain all vacant areas in the shelf, and each vacant area has position information and depth information;

a step 103 of stitching the shelf RGB images into a complete shelf image, performing a merging process and a de-duplicating process on the commodity detection boxes, the shelf label detection boxes and the layer lattice detection boxes and all vacant areas, and mapping them to the complete shelf image; i.e., the step of image stitching in FIG. 4;

a step 104 of delimiting a placement area of each commodity for the complete shelf image to generate a shed grid area corresponding to each commodity; dividing the all vacant areas in the shelf based on the shed grid area corresponding to each commodity to obtain the vacant area corresponding to each commodity, and the vacant area corresponding to each commodity has position information and depth information; i.e., the step of vacancy division in FIG. 4;

a step 105 of determining an out-of-stock body volume in the vacant area corresponding to each commodity as an out-of-stock detection result based on the position information and the depth information of the vacant area corresponding to each commodity, i.e., the step of calculating out-of-stock body volume.

The method for out-of-stock detection of shelf commodities provided by the embodiments of the present disclosure has the beneficial technical effects as below:

firstly, in the embodiments of the present disclosure, each shelf RGB image is input into an object detection model pre-trained by using a deep learning method, to detect all commodities to obtain a commodity detection boxes; all electronic shelf labels are detected to obtain shelf label detection boxes; all shelf layer lattices are detected to obtain shelf layer lattice detection boxes, and each detection boxes are accurately obtained to lay the foundation for subsequent out-of-stock area detection.

Secondly, compared with the solution in the prior art that the depth information of the depth image is directly used to obtain the vacant area and accuracy of out-of-stock area detection is low, the embodiments of the present disclosure can obtain a more accurate out-of-stock area by reversely deducing the vacant area using the shed grid area and the commodity detection boxes and based on a shelf visual RGB image and the shelf depth image with depth information.

Thirdly, compared with the solution that image stitching is performed first and then detection and recognition are performed, which is too dependent on the effect of image stitching, and accuracy of out-of-stock area detection is low, in the embodiment of the present disclosure can finally obtain a more accurate vacant area by performing image stitching after the detection of the vacant area, and comprehensively considering the shelf label position, the commodity position, the visual vacant area and the depth value information during determination of the vacant area, thereby improving the accuracy of the out-of-stock detection result.

In summary, the solution for out-of-stock detection of shelf commodities provided by the embodiments of the present disclosure improves the accuracy of the out-of-stock detection result. Detailed introduction is given below in conjunction with FIGS. 2 to 7.

Figure 2:
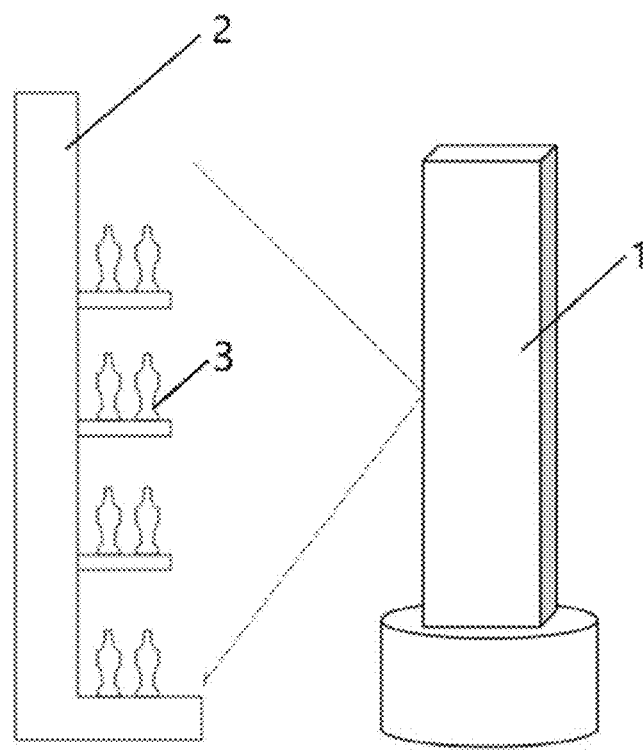
FIG. 2 is a schematic diagram of a robot photographing the shelf according to an embodiment of the present disclosure.

As shown in FIG. 2, the device or system involved in the detection includes:

(a) a wheeled robot (internal structure diagram shown in FIG. 8), including a chassis and a machine body, as shown in FIG. 2.

(b) The chassis is a motion module and includes a motor, a battery, wheels, computer hardware and computer software, etc.

Figure 8:
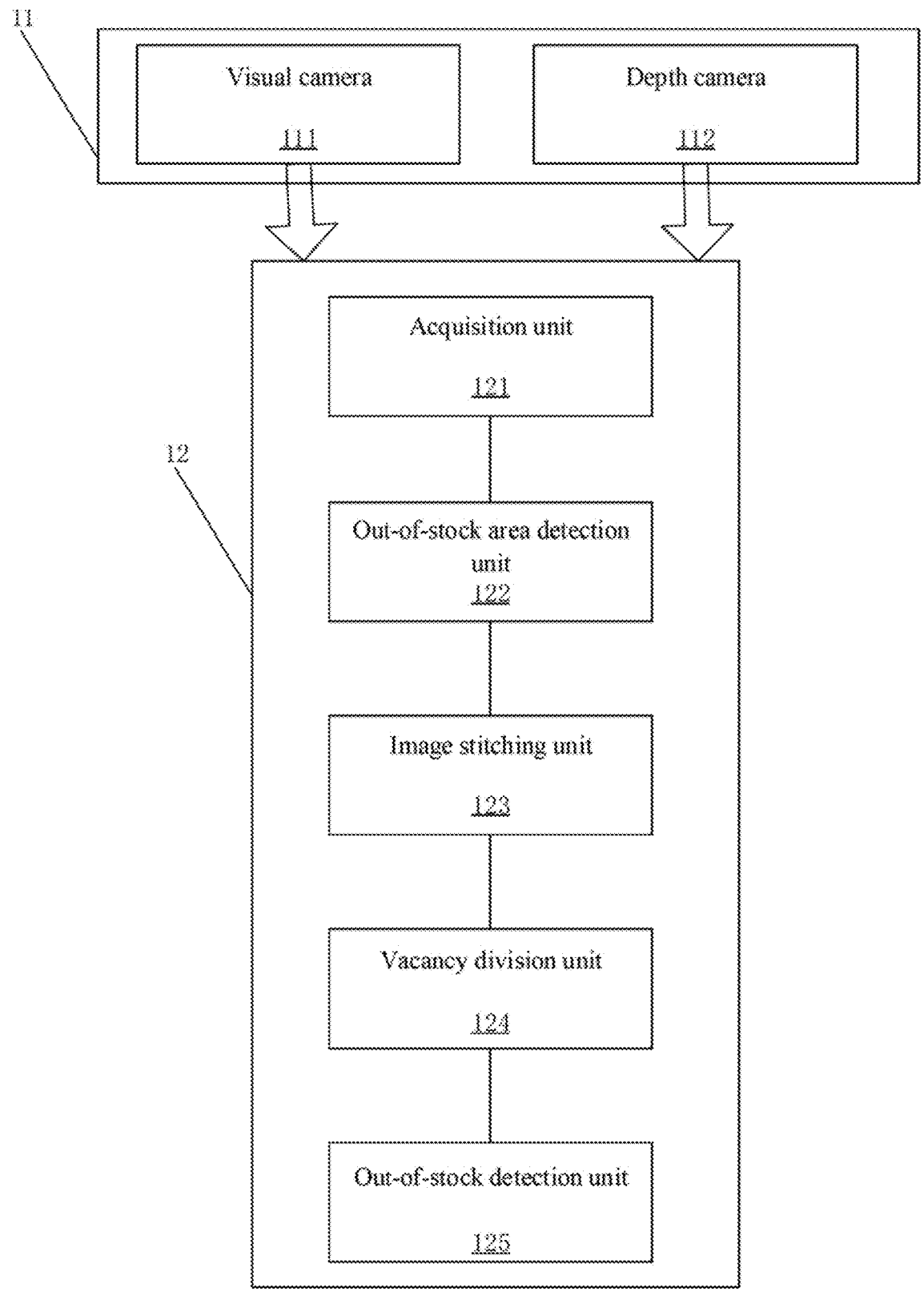
FIG. 8 is a structural schematic diagram of a robot for out-of-stock detection of shelf commodities according to an embodiment of the present disclosure.

(c) The machine body includes a photographing system (a photographing device 11 as shown in FIG. 8) and a computing system (an apparatus 12 for out-of-stock detection of shelf commodities as shown in FIG. 8), and is equivalent to human eyes and brains. The photographing system includes several visual cameras (111) and pairs of depth cameras (112), a fill light, etc., and the visual camera can photograph a shelf RGB image, the depth camera can obtain a shelf depth image, which may be but not limited to, hardware such as a ToF (Time of Flight) camera or a structured light camera or the like that can obtain image depth information. The computing system includes software and hardware of a computer and an algorithm processing module, the algorithm processing module includes an algorithm model (such as an object detection model, a feature extraction model, a character recognition model, etc. mentioned in the embodiment of the present disclosure) and the required database, etc.

Figure 5:
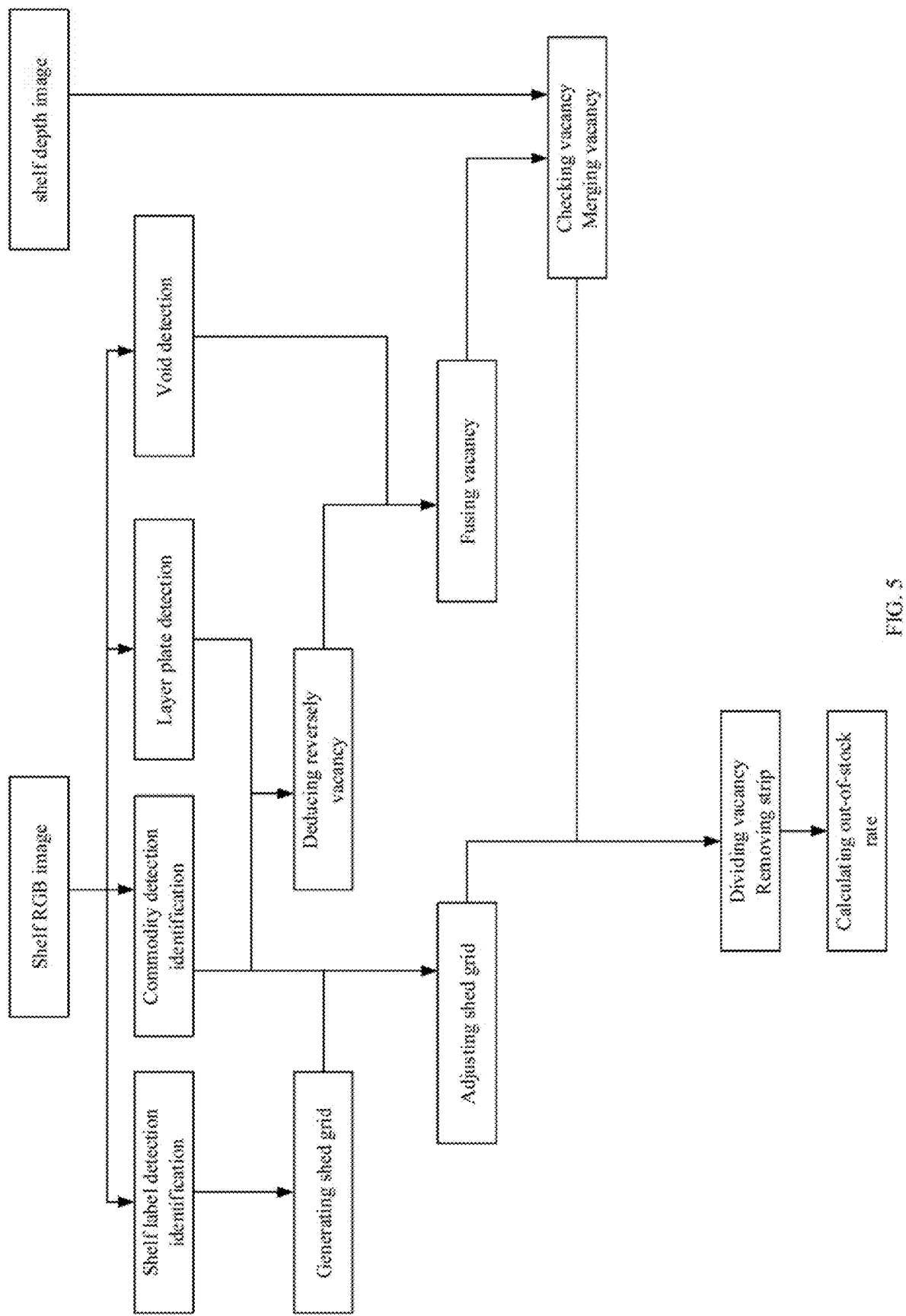
FIG. 5 is a schematic diagram of principle of out-of-stock detection of shelf commodities according to another embodiment of the present disclosure.

2. As shown in FIG. 5, the method of out-of-stock area delimitation and the out-of-stock rate calculation includes the following steps:

(1) The robot takes a photo in front of the shelf and obtains an image.

As shown in FIG. 1, the photographing system of the robot 1 includes a vertical row of several cameras, which can take photos of upper, middle and lower parts of a shelf 2, and the robot takes a photo of only part of the shelf at one time, and it is necessary to take photos of the remaining parts of the entire shelf in the way of moving to left or right and certain parts overlapping in the pictures, and finally it is necessary to splice the captured images to restore the overall appearance of the shelf.

The visual camera (camera) can acquire a shelf RGB image, and the depth camera can acquire an image with depth information.

(2) The commodity in the visual image of the shelf is detected.

For the acquired RGB image, a. using the object detection model of the algorithm processing module in the computing system to detect all commodities 3 (as shown in FIG. 2) to obtain a detection boxes, i.e., inputting each shelf RGB image into an object detection model pre-trained by using a deep learning method, detecting all commodities to obtain commodity detection boxes, as shown by "31" in FIG. 3;

b. cropping out an area thumbnail of the commodity by using the image processing method based on a coordinate and width and height of the detection box;

in this embodiment, the object detection model may be trained by using a deep learning method, that is, the commodity is labeled by using the collected scene image data, and then a deep network model is trained and verified based on the idea of maximum likelihood. The deep network model includes but is not limited to a deep convolutional network model and a visual VIT (Vision Transformer) type model.

The commodity in the visual image of the shelf is identified (optional):

(3) For the detected and cropped out image in the step (2), a. sending the cropped out thumbnail into the feature extraction model for feature extraction;

b. performing a retrieving process and a calculation process on the features extracted in the previous step and the preset commodity feature database in the algorithm processing module, to calculate Euclidean distance between the features, and take a result corresponding to the minimum Euclidean distance value as a commodity identified result with the highest confidence;

in this embodiment, the feature extraction model is trained by using the deep learning method, that is, the commodity is labeled and classified by using the collected scene image data, and then the deep network model is trained and verified.

It can be seen from the above that, in an embodiment, the method for out-of-stock detection of shelf commodities described above may further include:

cropping out an area thumbnail of the commodity based on position information of the commodity detection box;

inputting the cropped out area thumbnail of the commodity into the feature extraction model which is pre-trained by the deep learning method, for feature extraction; and matching the extracted feature to a feature in a preset commodity feature database, to calculate a Euclidean distance between the extracted feature and the feature in the preset commodity feature database, and take a result corresponding to the minimum Euclidean distance as a commodity identified result with the highest confidence.

In specific implementation, the above embodiment achieves to recognize the commodity, specifically it is possible to determine which specific kind of commodities are out of stock by subsequently identifying the identified commodities, and of course, it is possible to use the commodity identified result to adjust the shed grid to further improve the accuracy of out-of-stock detection, as detailed in the following embodiment.

(4) The shelf label in the visual image of the shelf is detected.

For the acquired RGB image, a. using the object detection model of the algorithm processing module in the computing system to detect all electronic shelf labels, i.e., detecting all electronic shelf labels to obtain a shelf label detection box, to obtain a detection box as "21" in FIG. 3;

b. cropping out an area thumbnail of the shelf label by using the image processing method based on the coordinates and width and height of the detection box;

in this embodiment, the object detection model is trained by using a deep learning method, that is, the shelf label is labeled by using the collected scene image data and then a deep network model is trained and verified based on the idea of maximum likelihood. The deep network model includes but is not limited to a deep convolutional network model and a visual VIT type model.

(5) The detected shelf label is identified.
   a. sending the cropped out thumbnail detected in the step (4) into the character recognition model or an OCR (Optical Character Recognition) algorithm model, and recognizing text or a character code in the shelf label;
   b. searching and matching the text or the character code identified in the previous step, with the "commodity information database" preset in the algorithm processing module, to use the searched corresponding searched commodity information as the identified result of the shelf label (optional);
   in this embodiment, the character recognition model may be trained by using a deep learning method, that is, the character code is labeled by using the collected scene image data, and then a deep network model is trained and verified based on the idea of maximum likelihood. The deep network model includes but is not limited to a deep convolutional network model and a visual VIT type model.

In an embodiment, the method for out-of-stock detection of shelf commodities described above may further include:
   cropping out an area thumbnail of the shelf label based on position information of the shelf label detection box;
   inputting the cropped out area thumbnail of the shelf label into the character recognition model which is pretrained by utilizing the deep learning method, to identify text information of the shelf label; and
   searching and matching the identified text information of the shelf label, with a text information of the shelf label in the preset commodity information database, and taking the corresponding searched and matched commodity information as the identified result of the shelf label.

In specific implementation, in the above embodiment, a shelf label is identified, and subsequently the shelf label can be associated with the corresponding commodity based on the shelf label identified result, which can quickly determine which specific kind of commodities are out of stock.

(6) The layer plate in the visual image of the shelf is divided.
   A method 1: sending an RGB image into a network model and directly outputting the detection box of the shelf layer plate based on the object detection model trained by the deep learning method, i.e., detecting all shelf layer plates to obtain shelf layer plate detection boxes, such as "23" in FIG. 3.
   A method 2: performing fitting based on the position of the shelf label detected in the step (4), i.e., the shelf labels in the same layer are connected by a line, and the average horizontal line is regarded as a layer plate line.

(7) Dividing the layer lattices
   A method 1: defining height of a lattice based on position of the layer plate, and defining the range between two layer plates as a layer lattice. One of the purposes of the above detection of all shelf layer plates to obtain the shelf layer plate detection boxes is to realize the method 1 based on the shelf layer plate detection boxes, and the other of the purposes is to be applied to the following step "(13) image stitching", as described in the following embodiments.
   A method 2: sending the RGB images into a network model and directly outputting detection boxes of the shelf layer lattice area based on the object detection model trained by the deep learning method, i.e., detecting all shelf layer lattices to obtain shelf layer lattice detection boxes;
   and the final layer lattice area is identified as "25" in FIG. 3.

(8) The vacancy is deduced reversely based on the layer lattice and the commodity, to obtain a vacant area 1 (a first vacant area), that is, the above step 1022.
   By the image processing method, the masks of the layer lattice and the commodity detection box are calculated respectively, and the result of removing the mask of the layer lattice from the mask of the commodity is taken as the vacant area 1, such as the gray area in FIG. 3.

(9) The void in the visual image of the shelf is detected to obtain the vacant area 2 (a second vacant area) (optional).
   In order to prevent errors and omissions in the vacant area obtained in the step (8), for the acquired RGB image,
      using the object detection model of the algorithm processing module in the computing system to detect all vacant commodity locations in the image, to obtain detection boxes of the vacant location, such as "24" in FIG. 3;
      in this embodiment, the object detection model is trained by using a deep learning method, i.e., the vacant locations are labeled accurately by using the collected scene image data, and then a deep network model is trained and verified based on the idea of maximum likelihood (the deep network model includes but is not limited to a deep convolutional network model and a visual VIT type model).

(10) The vacant area 1 and the vacant area 2 are fused and merged (optional).
   For the vacant area 1 and the vacant area 2, the union of the two areas is taken to obtain a vacant area 3 (a third vacant area).

It can be seen from the above that, in an embodiment, the method for out-of-stock detection of shelf commodities described above may further include:
   detecting a void in each shelf RGB image by utilizing the object detection model, to obtain a second vacant area;
   fusing and merging the first vacant area and the second vacant area to obtain a third vacant area corresponding to each shelf RGB image;
   then subsequently merging the first vacant area and the fourth vacant area both of which correspond to each shelf RGB image to obtain all vacant areas in the shelf, may include: merging the third vacant area and the fourth vacant area both of which correspond to each shelf RGB image to obtain all vacant areas in the shelf.

In specific implementation, the voids in each shelf RGB image can be detected by utilizing the object detection model, and subsequently the accuracy of out-of-stock detection can be improved.

(11) Checking range and depth value of the vacant area
   For the acquired depth image,
      the detection boxes of all shelf labels in the RGB image are overlaid on the depth image, and the average depth value x1 of area pixel in all shelf label detection boxes is counted, the area of all shelf label detection boxes is regarded as the foremost layout, and all depth values are modified to x1. By the same token, the vacant area 3 acquired on the RGB image is correspondingly overlaid on the depth image, and the average depth value x2 of all pixel in the area is counted, and all vacant areas are regarded as the deepest bottom of the shelf, and all depth values are modified to x2.

In the layer lattice, the pixels with depth values between x1 and x2 are neither the foremost nor the fully short selling range, which may be regarded as the area in which the front row is in short selling and the rear row is exposed, at that time a range value [x1+a, x2−b] is set, and the pixel in this range are also regarded as the out-of-stock area, the vacant area 4 is obtained, and the depth value is defined as the average value in this area.

As can be seen from the above, in an embodiment, determining a first average depth value of area pixel in each shelf label detection box based on the shelf label detection boxes and the corresponding shelf depth image both of which correspond to each shelf RGB image, may include: overlaying all shelf label detection boxes in each RGB image on the corresponding shelf depth image, and counting the first average depth value of area pixel in all shelf label detection boxes;

determining the second average depth value of pixel in each first vacant area based on the first vacant area and the shelf depth image both of which correspond to each shelf RGB image, may include: overlaying the first vacant area corresponding to each shelf RGB image on the corresponding shelf depth image, and counting the second average depth value of all pixel in the first vacant area.

In specific implementation, the calculated vacant area on the RGB image is overlaid on the depth image, based on the idea of statistics in the area, more accurate area depth value can be obtained, which is conducive to the subsequent determination of the non-fully short selling vacant area and improve the accuracy of the out-of-stock detection results.

(12) Merging the vacant areas:

The vacant area 1 or the vacant area 3 and the vacant area 4 (the fourth vacant area) are merged and regarded as all vacant areas in the shelf, and each vacant area has position information and depth information of the detection box.

(13) Image stitching:

For the RGB image,

The images photographed in the step (1) are spliced to form a complete channel or a complete shelf, and in the image stitching process, the shelf label, commodity, layer plate, layer lattice and vacant areas obtained in the previous steps are merged and de-duplicated, then mapped to the spliced image.

It can be seen from the above that, in an embodiment, the method for out-of-stock detection of shelf commodities described above may further include: inputting each shelf RGB image into an object detection model pre-trained by using a deep learning method, and detecting all shelf layer plates to obtain shelf layer plate detection boxes; and stitching the shelf RGB images into a complete shelf image, performing a merging process and a de-duplicating process on the commodity detection boxes, the shelf label detection boxes and the layer lattice detection boxes and all vacant areas, and mapping them to the complete shelf image, may include: stitching the shelf RGB images into a complete shelf image, performing a merging process and a de-duplicating process on the commodity detection boxes, the shelf label detection boxes, the layer plate detection boxes and the layer lattice detection boxes and all vacant areas, and mapping them to the complete shelf image.

In specific implementation, the shelf label position, the commodity position, the layer plate position, the visual vacancy and depth value information are comprehensively considered during determination of the vacant area, which can finally obtain a more accurate vacant area.

(14) Generating shed grid:

For the spliced image, the placement area of each commodity can be delimited, that is, the shed grid area of the commodity.

A method 1:

a. Delimiting the shed grid based on the position of the shelf label on the image, e.g., defining width of a shed grid starting with the left edge of the first shelf label and ending with the left edge of the next shelf label from left to right if the shelf label is placed at the lower left position of the commodity in the supermarket, and defining two ends of the layer plate as the width of a shed grid if there is no shelf label on a shed grid;

b. defining height of the shed grid based on the position of the layer plate or the area of the layer lattice.

A method 2:

① Preemptively, training an object detection model for detecting a shed grid by using a deep learning method. The specific method includes:

a) collecting several images to form an image data set;

b) delimiting a possible placement area of each commodity in each image as the shed grid of the commodity, and manually delimiting and labeling with the position label information, to finally form label information set;

c) constructing a deep neural network model, and training the network model by using the above image data set and the corresponding label information set based on the idea of regression, to obtain a shed grid detection model;

② sending the current RGB image into the trained shed grid detection network model, to directly output the detection boxes of the possible shed grid area on the shelf;

③ associating the shed grid correspondingly with the nearest shelf label, the shed grid area representing the area where a specific commodity is placed; or counting the number of each kind of commodities in the shed grid, and the commodity with the largest number in the placement area is positioned in the area where the commodity represented by the shed grid.

(15) Adjusting shed grid (optional):

For the generated shed grid, there may be a certain deviation from the actual placement position of the commodity. In order to eliminate this deviation, adjustment is made based on the commodity identified result and the generated shed grid, the left and right boundaries of the shed grid can contain all the corresponding commodities near the current position, to finally obtain a more accurate commodity placement area, such as the middle shed grid area "22" in FIG. 3.

It can be seen from the above that, in an embodiment, the method for out-of-stock detection of shelf commodities described above may further include:

adjusting the generated shed grid area based on the commodity identified result, and adjusting the left and right boundaries of the shed grid area to contain all the corresponding commodities near the current position, to obtain the adjusted shed grid area corresponding to each commodity; and dividing the all vacant areas in the shelf based on the shed grid area corresponding to each commodity to obtain the vacant area corresponding to each commodity, includes: dividing the all vacant areas in the shelf based on the adjusted shed grid area corresponding to each commodity to obtain the vacant area corresponding to each commodity.

In specific implementation, the commodity identified result is used to adjust the shed grid generated by the shelf label, which can obtain more accurate commodity sales area, thereby calculating the out-of-stock rate more accurately.

(16) Dividing vacant area:

Considering that some vacant areas span a plurality of shed grids, the vacant areas are divided based on the shed grid, to achieve the effect as shown in FIG. 3.

(17) Removing fine vacant areas:

Considering that there are some gaps in the actual placement of commodity, the vacant area is deduced reversely based on the step (8) may have thin-stripped vacant areas (a strip-shaped vacant area with a ratio of length to width greater than 5), or a relatively small and thin vacant area delimited in the step (16), so the morphological method of image processing is used here to directly remove the small and thin vacant area.

It can be seen from the above that, in an embodiment, the method for out-of-stock detection of shelf commodities described above may further include: removing the strip-shaped vacant areas from the first vacant area corresponding to each shelf RGB image or from the vacant area corresponding to each commodity by using the morphological method of image processing. The ratio of length to width of the strip-shaped vacant area is greater than 5.

In specific implementation, removing the strip area can determine the vacant area more accurately and with high precision.

(18) Calculating shed grid body volume and out-of-stock body volume

For each divided shed grid, the width of the shed grid is taken as the width w of the shed grid body, the height of the shed grid is taken as the height h of the shed grid body, the value of x2 minus x1 in the step (11) is taken as the depth d, and the product w×h×d is taken as the volume V0 of the shed grid body. By the same token, for the vacant area in the shed grid, the volume V1 of each vacant body is calculated based on the information of its width, height and depth. If there are multiple vacant areas, multiple vacant bodies are formed, the corresponding volumes are V2, V3, and V4 . . . , and the final volume of the merged vacant bodies is Vs.

Because in the actual scene, the layer lattice area is often higher than the commodity, the vacant area deduced reversely in the step (8) has impractical vacancy. Thus the values V0 and Vs are multiplied by a discrete value of a scale [0,1] at the dimension of the height h, and the higher the height is, the lower the weight is, so as to weaken the influence degree of the upper part of the shed grid body and the upper part of the vacant body, to finally obtain more accurate V0 and Vs.

It can be seen from the above that, in an embodiment, the method for out-of-stock detection of shelf commodities described above may further include: multiplying the volume of the shed grid area body and the volume of the vacant area out-of-stock body by a discrete scale value of 0 to 1 in the height dimension to weaken the influence degree of the upper parts of the shed grid area body and the upper parts of the vacant area out-of-stock body; and the higher the height is, the lower the discrete scale value is.

In specific implementation, the shed grid area and the out-of-stock area are multiplied by a discrete scale value of 0 to 1, which can weaken a naturally impractical vacant area, and is conducive to subsequently improving the calculation accuracy of the out-of-stock rate.

Figure 6:
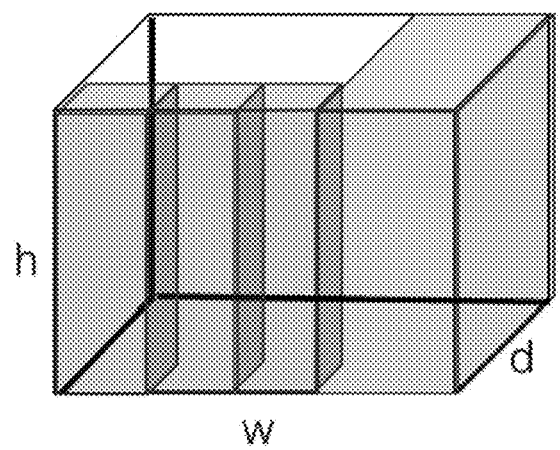
FIG. 6 is a three-dimensional diagram of a shelf according to an embodiment of the present disclosure.

(19) Determining information about out-of-stock areas:

As described in the step (14), each shed grid corresponds to a commodity. Each shed grid has corresponding shed grid body and out-of-stock body, and the out-of-stock rate=Vs/V0. The out-of-stock area is the vacant area, which may be displayed two-dimensionally or three-dimensionally on the spliced image based on its position, width, height and depth, as shown in FIG. 6. Finally, it is possible to report that the out-of-stock rate of the commodity named xxx is xx %, and the position is x layer x column on the shelf image, or the area is directly drawn.

It can be seen from the above that, in an embodiment, the shed area corresponding to each commodity has position information and depth information; the method for out-of-stock detection of shelf commodities may further include:

determining the volume of the shed grid area body corresponding to each commodity based on the position information and the depth information of the shed grid area corresponding to each commodity; and determining the out-of-stock rate of each commodity based on the volume of the shed grid area body and the volume of the vacant area out-of-stock body both of which correspond to each commodity, i.e., the step of "calculating an out-of-stock rate" in FIG. 4.

In specific implementation, compared with the solution in the prior art that the commodities with the same genus near the shelf label are allocated to the shelf label based on the idea of allocation, and whether the commodities are out of stock is determined based on the quantity threshold or area threshold, in the embodiment of the present disclosure, the out-of-stock rate is calculated based on a volume method, which can more accurately calculate the out-of-stock proportion of fully short selling to non-fully short selling, and obtain a more accurate out-of-stock rate. The shed grid area and the commodity detection box are used to deduce reversely the vacant area according to the embodiment of the present disclosure, compared with using the depth information of the depth image directly to obtain the vacant area, the more accurate area may be obtained and calculation is simpler, and the robustness is higher and the cost of model training is lower compared with the method of directly calculating the out-of-stock area based on deep learning.

In summary, in the embodiment of the present disclosure, the accurate commodity vacant position on the shelf can be obtained, and the accurate actual shed grid area of each commodity can be obtained, so as to calculate an accurate commodity out-of-stock rate, showing a more visual commodity out-of-stock situation or commodity placement saturation situation.

The embodiments of the present disclosure further provide an apparatus for out-of-stock detection of shelf commodities, which is described in the following embodiment. Since the principle of the apparatus to solve the problem is similar to the out-of-stock detection method of the shelf commodities, the implementation of the apparatus can be seen by referring to the implementation of the method for out-of-stock detection of shelf commodities, and the same contents are not repeated here.

Figure 7:
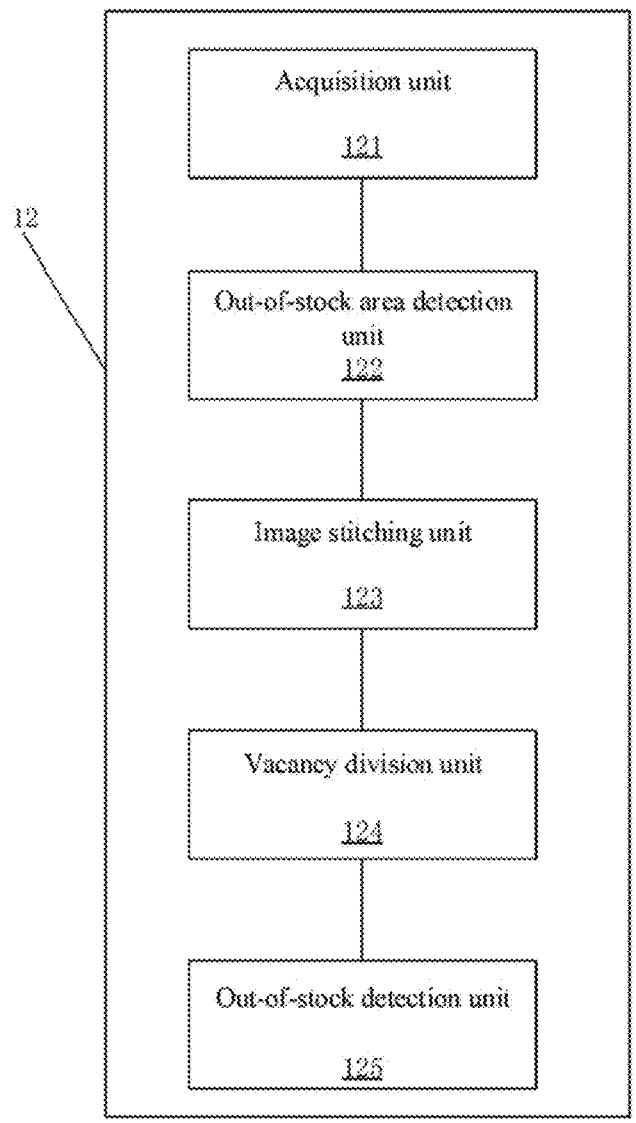
FIG. 7 is a structural schematic diagram of an apparatus for out-of-stock detection of shelf commodities according to an embodiment of the present disclosure.

FIG. 7 is a structural schematic diagram of a device 12 for detecting out-of-stock of shelf commodity according to the embodiment of the present disclosure, as shown in FIG. 7, the device comprising:

an acquisition unit 121 configured to acquire a plurality of shelf RGB images and a plurality of shelf depth images;

an out-of-stock area detection unit 122 configured to execute out-of-stock area detection steps as follows for each shelf RGB image and each shelf depth image:

inputting each shelf RGB image into an object detection model pre-trained by using a deep learning method, detecting all commodities to obtain commodity detection boxes; detecting all electronic shelf labels to obtain shelf label detection boxes; and detecting all shelf layer lattices to obtain shelf layer lattice detection boxes;

obtaining a first vacant area corresponding to each shelf RGB image based on position information of the commodity detection boxes and the shelf layer lattice detection boxes both of which correspond to each shelf RGB image;

determining a first average depth value of pixel in each shelf label detection box based on the shelf label detection boxes and the shelf depth image both of which correspond to each shelf RGB image; determining a second average depth value of pixel in each first vacant area based on the first vacant area and the shelf depth image both of which correspond to each shelf RGB image; obtaining a fourth vacant area corresponding to each shelf RGB image based on the pixel whose depth values are in a set range; and the set range is determined based on the first average depth value and the second average depth value;

merging the first vacant area and the fourth vacant area both of which correspond to each shelf RGB image to obtain all vacant areas in the shelf, and each vacant area has position information and depth information;

an image stitching unit 123 configured to splice the shelf RGB images into a complete shelf image, perform a merging process and a de-duplicating process on the commodity detection boxes, the shelf label detection boxes and the layer lattice detection boxes and all vacant areas, and map them to the complete shelf image;

a vacancy division unit 124 configured to delimit a placement area of each commodity for the complete shelf image to generate a shed grid area corresponding to each commodity; and divide the all vacant areas in the shelf based on the shed grid area corresponding to each commodity to obtain a vacant area corresponding to each commodity, and the vacant area corresponding to each commodity has position information and depth information; and an out-of-stock detection unit 125 configured to determine an out-of-stock body volume in the vacant area corresponding to each commodity as an out-of-stock detection result based on the position information and the depth information of the vacant area corresponding to each commodity.

In an embodiment, the apparatus for out-of-stock detection of shelf commodities described above may further include a commodity identification unit configured to:

crop out an area thumbnail of the commodity based on position information of the commodity detection box;

input the cropped out area thumbnail of the commodity into the feature extraction model which is pre-trained by utilizing the deep learning method, for feature extraction; and match the extracted feature and the feature in a preset commodity feature database, to calculate a Euclidean distance between the extracted feature and the feature in the preset commodity feature database, and take a result corresponding to the minimum Euclidean distance as a commodity identified result with the highest confidence.

In an embodiment, the apparatus for out-of-stock detection of shelf commodities described above may further include an adjustment unit configured to adjust the generated shed grid area based on the commodity identified result, and adjust the left and right boundaries of the shed grid area to contain all the corresponding commodities near the current position, to obtain the adjusted shed grid area corresponding to each commodity; and the vacancy division unit is specifically configured to divide the all vacant areas in the shelf based on the adjusted shed grid area corresponding to each commodity to obtain the vacant area corresponding to each commodity.

In an embodiment, the apparatus for out-of-stock detection of shelf commodities described above may further include a commodity identification unit configured to:

crop out an area thumbnail of the shelf label based on position information of the shelf label detection box;

input the cropped out area thumbnail of the shelf label into the character recognition model which is pre-trained by utilizing the deep learning method, to identify text information of the shelf label; and match the identified text information of the shelf label, with the text information of the shelf label in the preset commodity information database, and take the corresponding searched and matched commodity information as the identified result of the shelf label.

In an embodiment, the apparatus for out-of-stock detection of shelf commodities described above may further include:

an void detection unit configured to detect a void in each shelf RGB image by utilizing the object detection model, to obtain a second vacant area;

a merging processing unit configured to fuse and merge the first vacant area and the second vacant area to obtain a third vacant area corresponding to each shelf RGB image; and merging the first vacant area and the fourth vacant area both of which correspond to each shelf RGB image to obtain all vacant areas in the shelf, includes: merging the third vacant area and the fourth vacant area both of which correspond to each shelf RGB image to obtain all vacant areas in the shelf.

In an embodiment, the apparatus for out-of-stock detection of shelf commodities described above may further include a strip-shaped vacant area removal unit configured to remove the strip-shaped vacant areas from the first vacant area corresponding to each shelf RGB image or from the vacant area corresponding to each commodity by using the morphological method of image processing. The ratio of length to width of the strip-shaped vacant area is greater than 5.

In an embodiment, determining the first average depth value of pixel in each shelf label detection box based on the shelf label detection box and the corresponding shelf depth image both of which correspond to each shelf RGB image, may include: overlaying all shelf label detection boxes in each RGB image on the corresponding shelf depth image, and counting the first average depth value of area pixel in all shelf label detection boxes; and determining the second average depth value of pixel in each first vacant area based on the first vacant area and the shelf depth image both of which correspond to each shelf RGB image, may include: overlaying the first vacant area corresponding to each shelf RGB image on the corresponding shelf depth image, and counting a second average depth value of all pixel in the first vacant area.

In an embodiment, the shed area corresponding to each commodity has position information and depth information; the out-of-stock detection unit may also be configured to:

determine the volume of the shed grid area body corresponding to each commodity based on the position information and the depth information of the shed grid area corresponding to each commodity; and determine the out-of-stock rate of each commodity based on the volume of the shed grid area body and the volume of the vacant area out-of-stock body both of which correspond to each commodity.

In an embodiment, the apparatus for out-of-stock detection of shelf commodities described above may further include a discrete processing unit configured to multiply the volume of the shed grid area body and the volume of the vacant area out-of-stock body by a discrete scale value of 0 to 1 in the height dimension to weaken the influence degree of the upper parts of the shed grid area body and the upper parts of the vacant area out-of-stock body; and the higher the height is, the lower the discrete scale value is.

In an embodiment, the apparatus for out-of-stock detection of shelf commodities described above may further include a layer plate detection unit configured to input each shelf RGB image into an object detection model pre-trained by using a deep learning method, and detect all shelf layer plates to obtain a shelf layer plate detection boxes; and the image stitching unit is specifically configured to splice the shelf RGB images into a complete shelf image, perform a merging process and a de-duplicating process on the commodity detection boxes, the shelf label detection boxes, the layer plate detection boxes, the layer lattice detection boxes and all vacant areas, and mapping them to the complete shelf image.

The embodiments of the present disclosure further provide a robot for out-of-stock detection of shelf commodities, which is described in the following embodiment. Since the principle of the robot to solve the problem is similar to the out-of-stock detection method of the shelf commodities, the implementation of the robot can be seen by referring to the implementation of the method for out-of-stock detection of shelf commodities, and the same contents are not repeated here.

FIG. 8 is a structural schematic diagram of a robot for out-of-stock detection of shelf commodities according to the embodiment of the present disclosure, as shown in FIG. 8, the robot includes:

a photographing device 11 including: a visual camera 111 for photographing a plurality of shelf RGB images; and a depth camera 112 for photographing a plurality of shelf depth images; and the photographing device is configured to implement the step of photographing an image in FIG. 4;

The apparatus 12 for out-of-stock detection of shelf commodities as described above is configured to obtain the out-of-stock detection result of each commodity based on the plurality of shelf RGB images and the plurality of shelf depth images.

The embodiments of the present disclosure further provide a computer device including a memory, a processor and a computer program stored on the memory and executable on the processor, and when executing the computer program, the processor implements the method for out-of-stock detection of shelf commodities as described above.

The embodiments of the present disclosure also provide a computer-readable storage medium storing a computer program, and when being executed by a processor, the processor implements the method for out-of-stock detection of shelf commodities as described above.

The embodiments of the present disclosure also provide a computer program product including a computer program, and when being executed by a processor, the computer program implements the method for out-of-stock detection of shelf commodities as described above.

The solution for out-of-stock detection of shelf commodities provided by the embodiments of the present disclosure has the beneficial technical effects as below:

firstly, in the embodiments of the present disclosure, each shelf RGB image is input into an object detection model pre-trained by using a deep learning method, to detect all commodities to obtain commodity detection boxes; all electronic shelf labels are detected to obtain shelf label detection boxes; all shelf layer lattices are detected to obtain shelf layer lattice detection boxes, and each detection boxed is accurately obtained to lay the foundation for subsequent out-of-stock area detection.

Secondly, compared with the solution of the prior art that the depth information of the depth image is directly used to obtain the vacant area and accuracy of out-of-stock area detection is low, the embodiments of the present disclosure can obtain a more accurate out-of-stock area by reversely deducing the vacant area using the shed grid area and the commodity detection boxes and based on the shelf visual RGB image and the shelf depth image with depth information, Thirdly, compared with the solution that image stitching is performed first and then detection and identification are performed, which is too dependent on the effect of image stitching, and accuracy of out-of-stock area detection is low, the embodiments of the present disclosure can finally obtain a more accurate vacant area by performing image stitching after the detection of the vacant area, and comprehensively considering the shelf label position, commodity position, visual vacant area and depth value information during determination of the vacant area, thereby improving the accuracy of the out-of-stock detection result.

In summary, the solution for out-of-stock detection of shelf commodities provided by the embodiments of the present disclosure improves the accuracy of the out-of-stock detection result.

Those skilled in the art shall understand that, the embodiments of the present disclosure may be provided as a method, a system or a computer program product. Therefore, the present disclosure may adopt the forms of a full hardware example, a full software example, or combination of a software example and a hardware example. Moreover, the present disclosure may adopt the form of a computer program product that is implemented on one or more computer-usable storage medium (including but not limited to a disk memory, a CD-ROM, an optical memory, and etc.) including computer-usable program codes.

The disclosure is described with reference to flow diagrams and/or block diagrams of the method, the apparatus (system) and the computer program product according to the embodiment of the disclosure. It should be understood that each flow and/or block in the flow diagrams and/or block diagrams, and the combination of the flows and/or blocks in the flow diagrams and/or block diagrams may be achieved by computer program commands. These computer program commands may be provided to a CPU (Central Processing Unit) of a general-purpose computer, a special-purpose computer, an embedded processor or other programmable data processing device to produce a machine, so that an apparatus for achieving functions designated in one or more flows in the flow diagrams and/or one or more blocks in the block diagrams can be generated by the command executed by the CPU of the computer or other programmable data processing device.

These computer program instructions may also be stored in a computer-readable memory that can guide a computer or other programmable data processing device to operate in a special way, so that the instruction stored in the computer-readable memory generates a manufactured product including an instruction device which achieves functions designated in one or more flows in the flow diagrams and/or one or more blocks in the block diagrams.

These computer program instructions may also be loaded on a computer or other programmable data processing device, on which a series of operation steps are executed to generate processing achieved by the computer, so that the instruction executed on the computer or other programmable data processing device is provided for being used in the steps of achieving functions designated in one or more flows in the flow diagrams and/or one or more blocks in the block diagrams.

The purpose, technical solution and beneficial effect of the disclosure have been further described in detail in the above specific embodiments, it should be understood that the above contents are merely specific embodiments of the disclosure and are not for limiting protection scope of the disclosure, and any modifications, equivalent replacements, improvements and the like within the spirit and principle of the present disclosure shall be included within the protection scope of the present disclosure.

What is claimed is:

1. A method for out-of-stock detection of shelf commodities, comprising:
    acquiring a plurality of shelf RGB images and a plurality of shelf depth images;
    executing out-of-stock area detection steps as follows for each shelf RGB image and each shelf depth image:
        inputting each shelf RGB image into an object detection model pre-trained by using a deep learning method, detecting all commodities to obtain commodity detection boxes; detecting all electronic shelf labels to obtain shelf label detection boxes; and detecting all shelf layer lattices to obtain shelf layer lattice detection boxes;
        obtaining a first vacant area corresponding to each shelf RGB image based on position information of the commodity detection boxes and the shelf layer lattice detection boxes both of which correspond to each shelf RGB image;
        determining a first average depth value of pixel in each shelf label detection box based on the shelf label detection boxes and the shelf depth image both of which correspond to each shelf RGB image; determining a second average depth value of pixel in each first vacant area based on the first vacant area and the shelf depth image both of which correspond to each shelf RGB image; obtaining a fourth vacant area corresponding to each shelf RGB image based on the pixel whose depth values are in a set range; wherein the set range is determined based on the first average depth value and the second average depth value; and
        merging the first vacant area and the fourth vacant area both of which correspond to each shelf RGB image to obtain all vacant areas in the shelf, wherein each vacant area has position information and depth information;
    stitching the shelf RGB images into a complete shelf image, performing a merging process and a de-duplicating process on the commodity detection boxes, the shelf label detection boxes and the layer lattice detection boxes and all vacant areas, and mapping them to the complete shelf image;
    delimiting a placement area of each commodity for the complete shelf image to generate a shed grid area corresponding to each commodity; dividing the all vacant areas in the shelf based on the shed grid area corresponding to each commodity to obtain a vacant area corresponding to each commodity, wherein the vacant area corresponding to each commodity has position information and depth information; and
    determining an out-of-stock body volume in the vacant area corresponding to each commodity as an out-of-stock detection result based on the position information and the depth information of the vacant area corresponding to each commodity.

2. The method according to claim 1, further comprising:
    cropping out an area thumbnail of the commodity based on position information of the commodity detection box;
    inputting the cropped out area thumbnail of the commodity into the feature extraction model which is pre-trained by the deep learning method, for feature extraction; and
    matching the extracted feature to a feature in a preset commodity feature database, to calculate a Euclidean distance between the extracted feature and the feature in the preset commodity feature database, and taking a result corresponding to the minimum Euclidean distance as a commodity identified result with the highest confidence.

3. The method according to claim 2, further comprising:
    adjusting the generated shed grid area based on the commodity identified result, and adjusting the left and right boundaries of the shed grid area to contain all the corresponding commodities near the current position, to obtain the adjusted shed grid area corresponding to each commodity; and
    dividing the all vacant areas in the shelf based on the shed grid area corresponding to each commodity to obtain the vacant area corresponding to each commodity, comprises: dividing the all vacant areas in the shelf based on the adjusted shed grid area corresponding to each commodity to obtain the vacant area corresponding to each commodity.

4. The method according to claim 1, further comprising:
    cropping out an area thumbnail of the shelf label based on position information of the shelf label detection box;
    inputting the cropped out area thumbnail of the shelf label into the character recognition model which is pre-trained by the deep learning method, to identify text information of the shelf label; and
    matching the identified text information of the shelf label with text information of the shelf label in the preset commodity information database, and taking the searched and matched commodity information as the identified result of the shelf label.

5. The method according to claim 1, further comprising:
    detecting a void in each shelf RGB image by utilizing the object detection model, to obtain a second vacant area;
    fusing and merging the first vacant area and the second vacant area to obtain a third vacant area corresponding to each shelf RGB image; and
    merging the first vacant area and the fourth vacant area both of which correspond to each shelf RGB image to obtain all vacant areas in the shelf, comprises: merging the third vacant area and the fourth vacant area both of which correspond to each shelf RGB image to obtain all vacant areas in the shelf.

6. The method according to claim 1, further comprising: removing the strip-shaped vacant areas from the first vacant area corresponding to each shelf RGB image or from the vacant area corresponding to each commodity by using the morphological method of image processing; wherein the ratio of length to width of the strip-shaped vacant area is greater than 5.

7. The method according to claim 1, wherein determining the first average depth value of pixel in each shelf label detection box based on the shelf label detection box and the corresponding shelf depth image both of which correspond to each shelf RGB image comprises: overlaying all shelf label detection boxes in each RGB image on the corresponding shelf depth image, and counting the first average depth value of pixel in all shelf label detection boxes; and determining the second average depth value of pixel in each first vacant area based on the first vacant area and the shelf depth image both of which correspond to each shelf RGB image comprises: overlaying the first vacant area corresponding to each shelf RGB image on the corresponding shelf depth image, and counting the second average depth value of all pixel in the first vacant area.

8. The method according to claim 1, wherein the shed grid area corresponding to each commodity has position information and depth information; and the method for out-of-stock detection of shelf commodities further comprises:

determining the volume of the shed grid area body corresponding to each commodity based on the position information and the depth information of the shed grid area corresponding to each commodity; and determining the out-of-stock rate of each commodity based on the volume of the shed grid area body and the volume of the vacant area out-of-stock body both of which correspond to each commodity.

9. The method according to claim 8, further comprising: multiplying the volume of the shed grid area body and the volume of the vacant area out-of-stock body by a discrete scale value of 0 to 1 in the height dimension to weaken the influence degree of the upper parts of the shed grid area body and the upper parts of the vacant area out-of-stock body; wherein the higher the height is, the lower the discrete scale value is.

10. The method according to claim 1, further comprising: inputting each shelf RGB image into an object detection model pre-trained by using a deep learning method, and detecting all shelf layer plates to obtain shelf layer plate detection boxes; and stitching the shelf RGB images into a complete shelf image, performing a merging process and a de-duplicating process on the commodity detection boxes, the shelf label detection boxes and the layer lattice detection boxes and all vacant areas, and mapping them to the complete shelf image comprises: stitching the shelf RGB images into a complete shelf image, and performing a merging process and a de-duplicating process on the commodity detection boxes, the shelf label detection boxes, the layer plate detection boxes and the layer lattice detection boxes and all vacant areas, and mapping them to the complete shelf image.

11. An apparatus for out-of-stock detection of shelf commodities, comprising:

an acquisition unit configured to acquire a plurality of shelf RGB images and a plurality of shelf depth images;

an out-of-stock area detection unit configured to execute out-of-stock area detection steps as follows for each shelf RGB image and each shelf depth image:

inputting each shelf RGB image into an object detection model pre-trained by using a deep learning method, detecting all commodities to obtain commodity detection boxes; detecting all electronic shelf labels to obtain shelf label detection boxes; and detecting all shelf layer lattices to obtain shelf layer lattice detection boxes;

obtaining a first vacant area corresponding to each shelf RGB image based on position information of the commodity detection boxes and the shelf layer lattice detection boxes both of which correspond to each shelf RGB image;

determining a first average depth value of pixel in each shelf label detection box based on the shelf label detection boxes and the shelf depth image both of which correspond to each shelf RGB image; determining a second average depth value of pixel in each first vacant area based on the first vacant area and the shelf depth image both of which correspond to each shelf RGB image; obtaining a fourth vacant area corresponding to each shelf RGB image based on the pixel whose depth values are in a set range; wherein the set range is determined based on the first average depth value and the second average depth value;

merging the first vacant area and the fourth vacant area both of which correspond to each shelf RGB image to obtain all vacant areas in the shelf, wherein each vacant area has position information and depth information;

an image stitching unit configured to splice the shelf RGB images into a complete shelf image, perform a merging process and a de-duplicating process on the commodity detection boxes, the shelf label detection boxes and the layer lattice detection boxes and all vacant areas, and map them to the complete shelf image;

a vacancy division unit for configured to delimit a placement area of each commodity for the complete shelf image to generate a shed grid area corresponding to each commodity; and divide the all vacant areas in the shelf based on the shed grid area corresponding to each commodity to obtain a vacant area corresponding to each commodity, wherein the vacant area and the shed grid area both of which correspond to each commodity both have position information and depth information; and an out-of-stock detection unit configured to determine an out-of-stock body volume in the vacant area corresponding to each commodity as an out-of-stock detection result based on the position information and the depth information of the vacant area corresponding to each commodity.

12. The apparatus according to claim 11, further comprising a commodity identification unit configured to:

crop out an area thumbnail of the commodity based on position information of the commodity detection box;

input the cropped out area thumbnail of the commodity into the feature extraction model which is pre-trained by utilizing the deep learning method, for feature extraction; and match the extracted feature and the feature in a preset commodity feature database, to calculate a Euclidean distance between the extracted feature and the feature in the preset commodity feature database, and take a result corresponding to the minimum Euclidean distance as a commodity identified result with the highest confidence.

13. The apparatus according to claim 12, further comprising an adjustment unit configured to:
adjust the generated shed grid area based on the commodity identified result, and adjust the left and right boundaries of the shed grid area to contain all the corresponding commodities near the current position, to obtain the adjusted shed grid area corresponding to each commodity; and
the vacancy division unit is configured to divide the all vacant areas in the shelf based on the adjusted shed grid area corresponding to each commodity to obtain the vacant area corresponding to each commodity.

14. The apparatus according to claim 11, further comprising a commodity identification unit configured to:
crop out an area thumbnail of the shelf label based on position information of the shelf label detection box;
input the cropped out area thumbnail of the shelf label into the character recognition model which is pre-trained by utilizing the deep learning method, to identify text information of the shelf label; and
match the identified text information of the shelf label, with the text information of the shelf label in the preset commodity information database, and take the corresponding searched and matched commodity information as the identified result of the shelf label.

15. The apparatus according to claim 11, further comprising:
an void detection unit configured to detect a void in each shelf RGB image by utilizing the object detection model, to obtain a second vacant area; and
a merging processing unit configured to fuse and merge the first vacant area and the second vacant area to obtain a third vacant area corresponding to each shelf RGB image;
wherein the merging the first vacant area and the fourth vacant area both of which correspond to each shelf RGB image to obtain all vacant areas in the shelf comprises: merging the third vacant area and the fourth vacant area both of which correspond to each shelf RGB image to obtain all vacant areas in the shelf.

16. A robot for out-of-stock detection of commodity on a shelf, comprising:
a photographing device comprising: a visual camera configured to photograph a plurality of shelf RGB images; and a depth camera configured to photograph a plurality of shelf depth images; and
the apparatus configured to out-of-stock detection of commodity on the shelf according to claim 11, for obtaining the out-of-stock detection result of each commodity based on the plurality of shelf RGB images and the plurality of shelf depth images.

17. The robot according to claim 16, wherein the apparatus further comprises a commodity identification unit configured to:
crop out an area thumbnail of the commodity based on position information of the commodity detection box;
input the cropped out area thumbnail of the commodity into the feature extraction model which is pre-trained by utilizing the deep learning method, for feature extraction; and
match the extracted feature and the feature in a preset commodity feature database, to calculate a Euclidean distance between the extracted feature and the feature in the preset commodity feature database, and take a result corresponding to the minimum Euclidean distance as a commodity identified result with the highest confidence.

18. The robot according to claim 17, wherein the apparatus further comprises an adjustment unit configured to:
adjust the generated shed grid area based on the commodity identified result, and adjust the left and right boundaries of the shed grid area to contain all the corresponding commodities near the current position, to obtain the adjusted shed grid area corresponding to each commodity; and
the vacancy division unit is configured to divide the all vacant areas in the shelf based on the adjusted shed grid area corresponding to each commodity to obtain the vacant area corresponding to each commodity.

19. The robot according to claim 16, wherein the apparatus further comprises a commodity identification unit configured to:
crop out an area thumbnail of the shelf label based on position information of the shelf label detection box;
input the cropped out area thumbnail of the shelf label into the character recognition model which is pre-trained by utilizing the deep learning method, to identify text information of the shelf label; and
match the identified text information of the shelf label, with the text information of the shelf label in the preset commodity information database, and take the corresponding searched and matched commodity information as the identified result of the shelf label.

20. The robot according to claim 16, wherein the apparatus further comprises:
an void detection unit configured to detect a void in each shelf RGB image by utilizing the object detection model, to obtain a second vacant area; and
a merging processing unit configured to fuse and merge the first vacant area and the second vacant area to obtain a third vacant area corresponding to each shelf RGB image;
wherein the merging the first vacant area and the fourth vacant area both of which correspond to each shelf RGB image to obtain all vacant areas in the shelf comprises: merging the third vacant area and the fourth vacant area both of which correspond to each shelf RGB image to obtain all vacant areas in the shelf.

* * * * *